Sept. 22, 1970  H. J. KAMNER ET AL  3,529,642
TREE HARVESTING

Filed Aug. 6, 1968  5 Sheets-Sheet 2

INVENTORS
HAIM J. KAMNER
ROY D. BROWNELL

Carl C. Batz
ATTY.

Sept. 22, 1970  H. J. KAMNER ET AL  3,529,642
TREE HARVESTING

Filed Aug. 6, 1968  5 Sheets-Sheet 5

INVENTORS
HAIM J. KAMNER
ROY D. BROWNELL

Carl C. Batz
ATTY.

United States Patent Office 3,529,642
Patented Sept. 22, 1970

3,529,642
TREE HARVESTING
Haim J. Kamner, Chicago, and Roy D. Brownell, Aurora, Ill., assignors to Baldwin-Lima-Hamilton Corporation, Chicago, Ill., a corporation of Delaware
Filed Aug. 6, 1968, Ser. No. 750,529
Int. Cl. A01g 23/02
U.S. Cl. 144—34        6 Claims

ABSTRACT OF THE DISCLOSURE

A tree harvesting and processing device including a shear freely pivotally suspended on a vertically swingable telescopic boom, the pivotal connection between the shear and the boom being directly vertically above the center of gravity of the shear whereby the shear is automatically maintained in a horizontal condition in any vertical angle of the boom.

BACKGROUND OF THE INVENTION

This invention relates generally to tree harvesting and processing devices and, more specifically, to tree harvesting shears.

In applicant's assignee's copending application by Sutherland, Ser. No. 692,749, filed Dec. 22, 1967, entitled "Tree Harvester," a novel apparatus is disclosed which includes a harvesting and processing device supported on a telescopic boom. The device comprises upper and lower sections, each including a hydraulically actuated tree shear and clamp for clamping the device to a standing tree and subsequently topping, delimbing, scoring and bucking a tree into pulpwood lengths or bolts. The upper and lower sections are relatively vertically moveable by vertical hydraulic cylinders to facilitate a step-by-step harvesting action as the device is moved down a standing tree.

Operation of the device, which may be automatically performed in proper sequence, may be generally summarized as follows. After initial positioning of the device to embrace a tree to be harvested, adjacent the top thereof, the top clamp is actuated to grasp the tree and support the entire device thereon. The telescopic boom is placed in a float condition. The upper shear is partially closed to bite into the tree top to a slight degree to aid in fixing the upper section of the device. Subsequently, the vertical cylinders may be extended whereby the lower section is forcefully lowered to an extent limited by maximum extension of these cylinders. In this manner, a portion of the tree embraced by the lower section during such movement is delimbed and scored. The lower clamp is then set, the upper shear actuated to completely sever the top of the tree, which is discarded, the upper clamp and shear opened, and the vertical cylinders retracted to move the upper section to a lower portion of the tree adjacent the lower section. This sequence of operation may be automatically repeated to move the device down the tree in a step-by-step manner and a kicker means may be provided to direct the fall of a series of bolts into a chute mounted on the telescopic boom which conveys the bolts to a collection area or means. Such compact tree harvesting and processing devices are particularly advantageous over the prior art devices which generally have been large, complex, expensive and so cumbersome that, as a practical matter, they could not be conveniently maneuvered in a forest to be harvested.

In utilizing tree harvesting devices of the type disclosed in the heretofore identified Sutherland application, it is necessary that the shear and clamp arrangement be maintained in a horizontal condition during initial placement and as the device is moved in a step-by-step manner down the tree. This is particularly important in that during operation the telescopic boom is placed in a float condition and merely follows the device down a standing tree being harvested on which it is entirely supported. Heretofore, it had been suggested to provide a hydraulic cylinder between the boom and the shear to change the angle therebetween to compensate for changes in the vertical boom angle. However, such an arrangement necessitated tedious independent control of the hydraulic cylinder by an operator or complicated hydraulic control angle compensating means.

SUMMARY OF THE INVENTION

It is a general object of the present invention to provide a tree harvesting and processing device of the type heretofore described which circumvents and minimizes the problems noted above.

In achieving this general object, the present invention provides a tree harvesting device including a boom adapted to be pivoted through a vertical angle and severing means suspended from the upper end thereof which is adapted to sever a standing tree. Connecting means are provided between the boom and the severing means which include a pivot means positioned directly vertically above the center of gravity of the severing means for maintaining the severing means in a horizontal condition in any operational angle of the boom.

BRIEF DESCRIPTION OF THE DRAWINGS

A more thorough understanding of one embodiment of the present invention may be gained by reference to the accompanying drawings, in which.

DETAILED DESCRIPTION OF THE INVENTION

Figure 1:
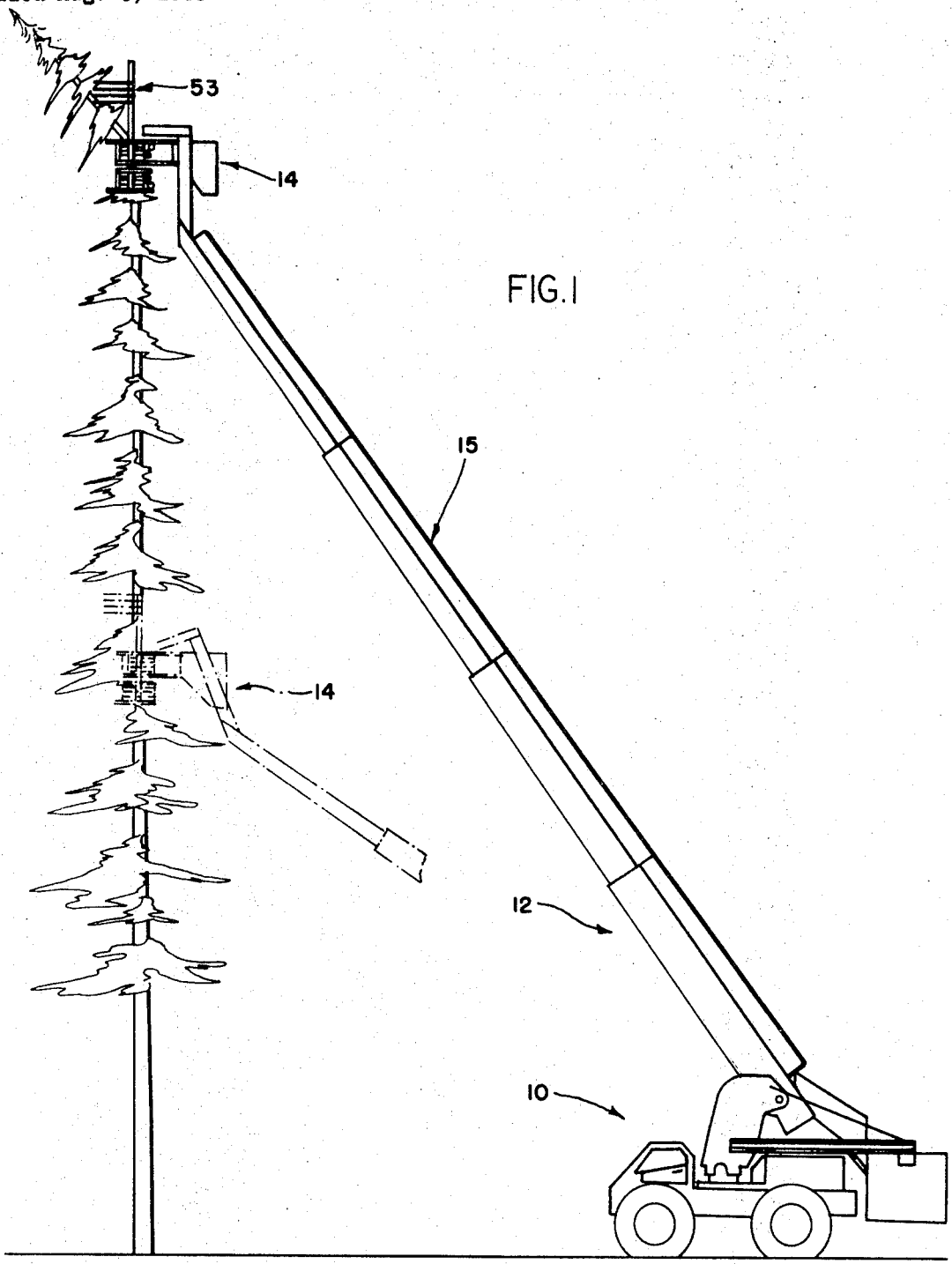
FIG. 1 is an elevational view showing in full line a tree harvesting and processing device according to the present invention positioned adjacent the top of the tree and a fragmentary showing in phantom line of the device after a few bolts have been harvested from the tree.

Referring in more detail to FIG. 1 of the drawings, the tree harvesting and processing device forming the basis of the present invention, as generally disclosed in the previous identified Sutherland application, comprises a self-propelled, crane-type vehicle 10, on which an extensible boom 12 is mounted. The boom 12 may be of the hydraulically actuated, telescopic type and is pivotally supported on the vehicle 10 for sweeping movement in vertical and horizontal directions for harvesting standing trees in a generally semi-circular area about the front of the vehicle. On the upper or free end of the boom 12, a tree shear and clamp assembly 14 is provided for topping, delimbing, scoring and severing or bucking a standing tree into pulpwood lengths or bolts. A telescopic conveyor 15 is provided to direct severed or sheared bolts to a collection area or means.

Figure 2:
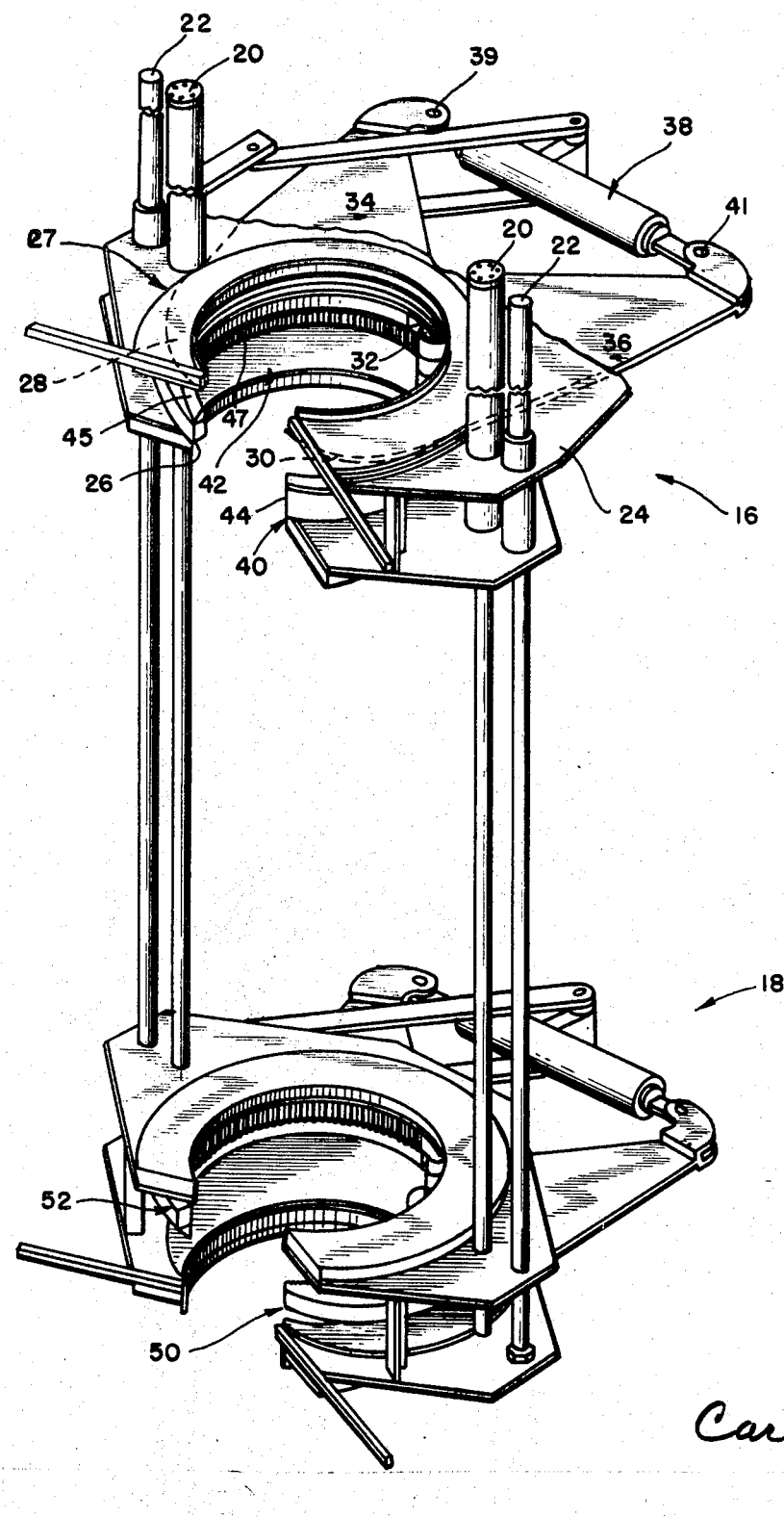
FIG. 2 is a fragmentary, perspective view from the front of a tree shear and clamp assembly shown in its extended condition of the device shown in FIG. 1.

With reference to FIG. 2 of the drawings, the tree shear and clamp assembly 14 comprises upper and lower sections 16 and 18 connected together for relative vertical movement by a pair of vertically extending double-acting hydraulic cylinders 20 and guide rods 22.

The upper section comprises a frame 24 having an arcuate recess 26 therein which is adapted to embrace a standing tree. An upper shear 27 is provided, this shear including a pair of shear blades 28 and 30, having arcuate shearing surfaces on their forward ends adjacent the recess 26. The blades 28 and 30 are pivotally mounted intermediate their length on the frame 24 by a common vertical pivot pin 32. The inner or rear ends 34 and 36 of the blades 28 and 30 extend rearwardly beyond the pin 32 and a double-acting, upper shear hydraulic cylinder assembly 38 is positioned therebetween. The cylinder and rod ends of the cylinder assembly 38 are pivotally connected by cylinder pins 39 and 41 to the rear ends 34 and 36 of the blades 28 and 30 respectively, whereby extension or retraction of the cylinder assembly 38 pivots the blades 28 and 30 about the pivot pin 32 to close and open the shear assembly in a scissor-like manner.

Positioned on the frame 24 immediately below the shear 27 is an upper tree clamp 40. The upper clamp 40 comprises a pair of arcuate jaws 42 and 44 pivotally mounted on a lower portion of the pivot pin 32. The clamp jaws 42 and 44 may include on their forward ends arcuate, vertical extending delimbing blades 45, as well as circularly arranged, horizontally, and inwardly directed bark scoring teeth 47.

Figure 5:
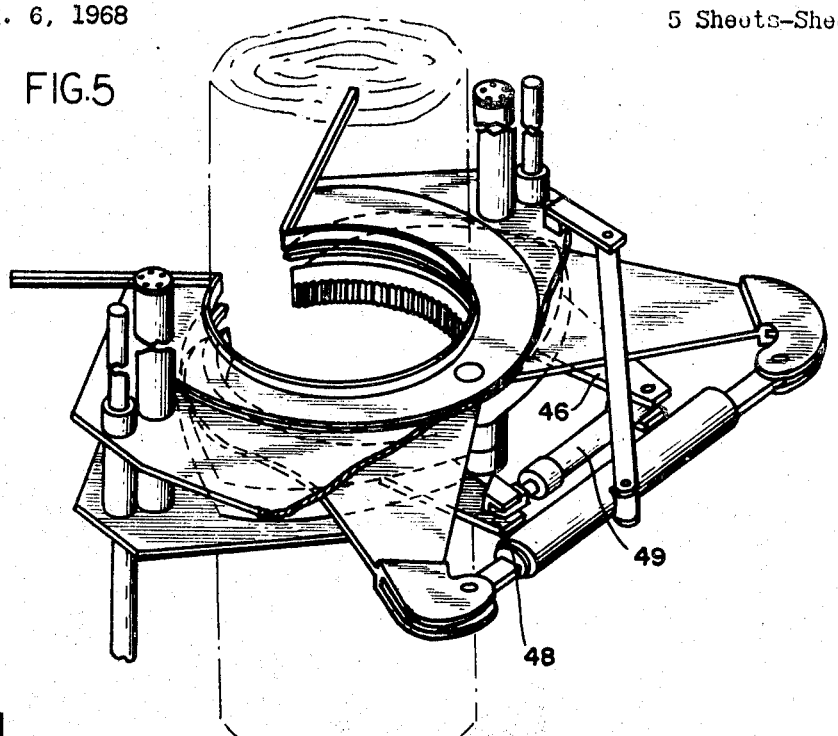
FIG. 5 is a fragmentary, perspective view from the rear of the shear and clamp assembly shown in FIG. 2 illustrated adjacent a tree in a position appropriate for a severing operation.
Figure 6:
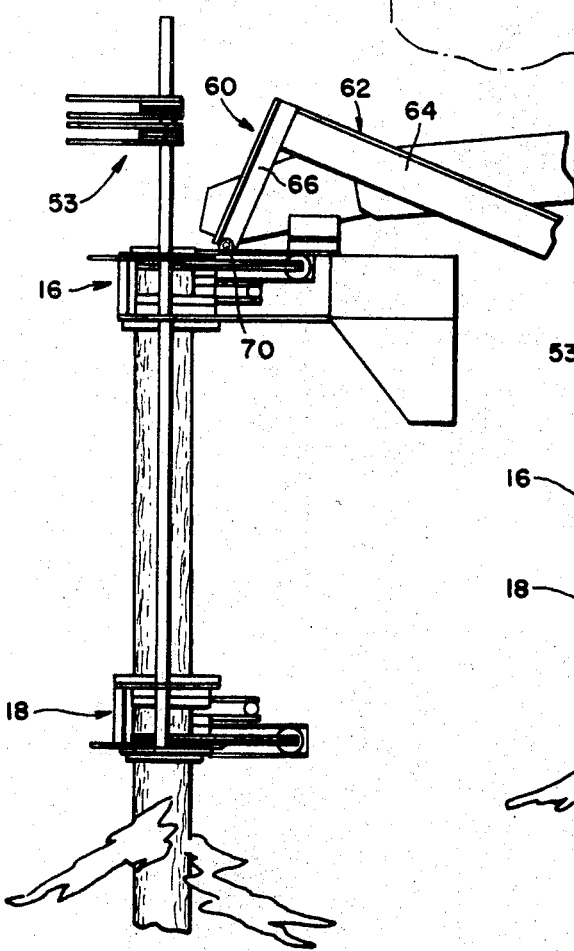
FIG. 6 is a schematic, elevational view of the shear and clamp assembly after a bolt has been cut and the lower section is extended to a lower position.
Figure 7:
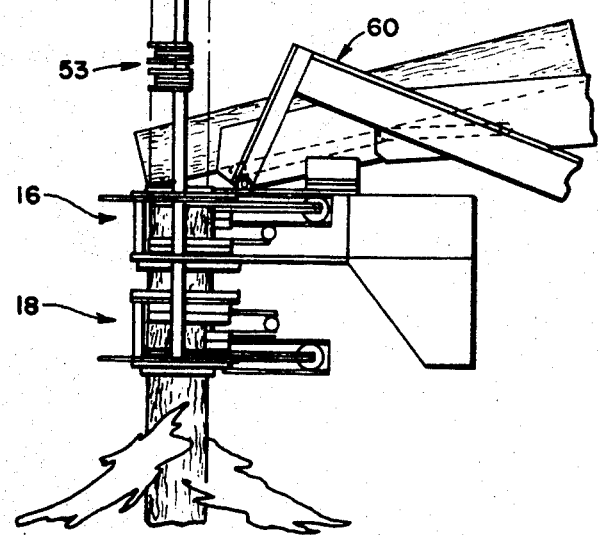
FIG. 7 is a schematic, elevational view similar to that shown in FIG. 6 but wherein the upper and lower sections are retracted to positions adjacent each other, as prior to a next cutting or severing operation of a sequence.

Referring to FIG. 5, the inner or rear ends 46, 48 of the jaws 42, 44, extend rearwardly beyond the pivot pin 32 and a double-acting hydraulic cylinder 49 is connected therebetween in a manner similar to the connection of the upper shear cylinder assembly 38.

The lower section 18 of the device, as shown in FIG. 2, comprises a lower shear 50 and clamp 52 similar in construction and operation to the upper shear 27 and upper clamp 40, except that the lower shear 50 is positioned below the lower clamp 52 to facilitate severing a tree as closely as possible to the ground level.

Figure 3:
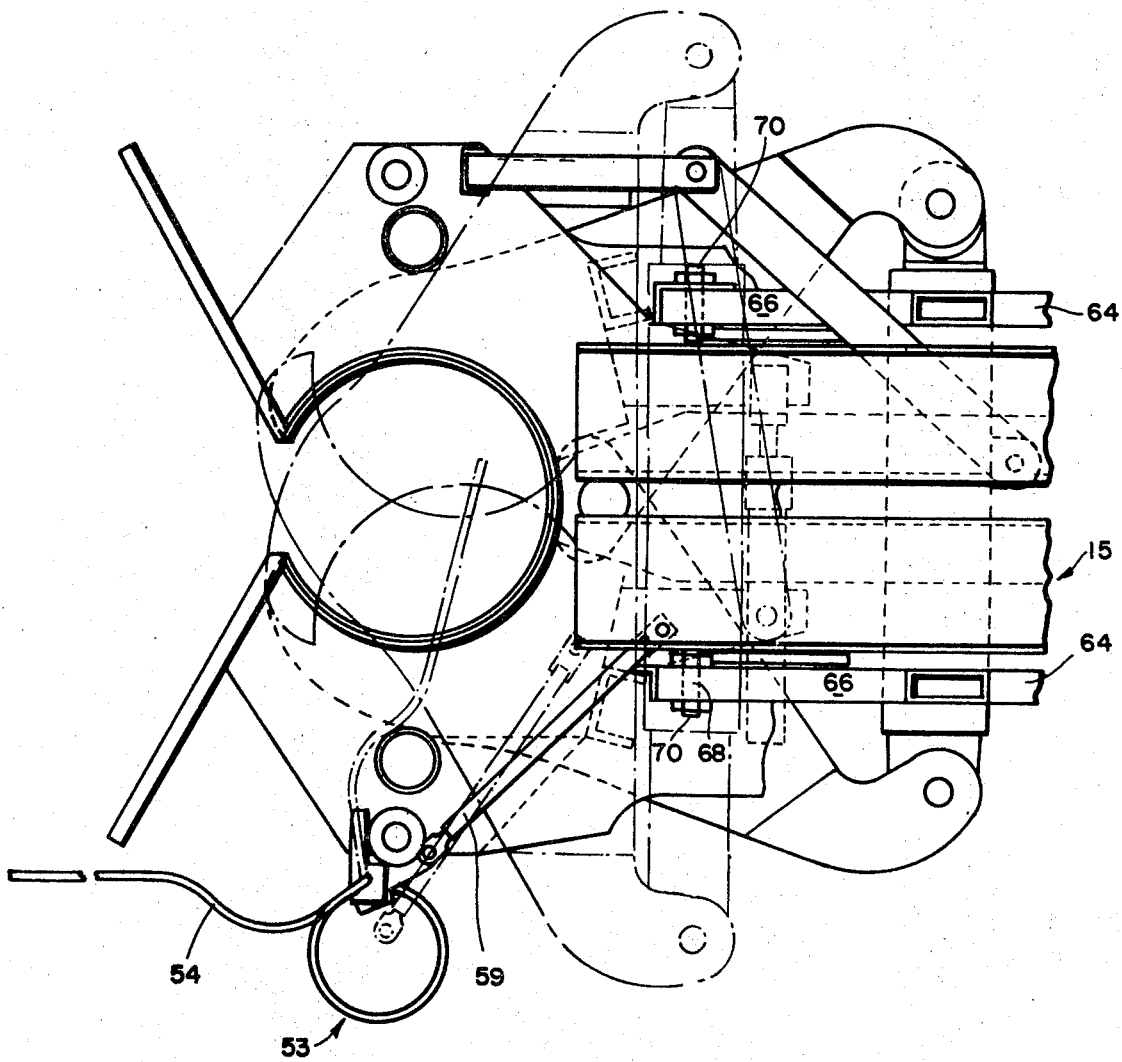
FIG. 3 is a fragmentary top view of the tree shear and clamp assembly shown in FIG. 2, shown in the open condition in full line and including a phantom line showing of the assembly in its closed position.

A spring-loaded bolt kicker or fall director 53 is mounted on and above the frame 24, the kicker being operationally connected by a link 59 to the blade 30 so that upon closing the blades a curved kicker arm 54 will pivot in a counterclockwise direction (as shown in FIG. 3) across the recess 26 thereby directing the fall of a severed bolt toward the chute 15.

Operation of the device as thus far described may be summarized as follows. Any suitable conventional hydraulic control system (not shown) may be manipulated by an operator positioned on the vehicle 10 to adjust the boom angle and length to position the shear and clamp assembly 14 adjacent the top of a tree, as shown in FIG. 1. The hydraulic control may be then operated to set the upper clamp and place the hydraulic boom in a "float" condition wherein the weight of the device is supported entirely on the tree. The upper shear may then be partially closed to partially embed the same into the tree to aid in fixing the upper section of the device to the tree during the subsequent delimbing and scoring operation. The vertical cylinders may be then extended thereby delimbing and scoring that portion of the tree embraced by the lower section during its descent. The lower clamp may be then actuated, the upper shear closed to completely sever a portion of the tree, the upper clamp and shear opened, the vertical cylinders retracted and the operation repeated until the entire standing tree has been sectionalized or bucked. Severed bolts are directed into the chute by the kicker and conveyed to a collection point. This entire operational sequence may be programmed or performed automatically as by electric or fluidic control means after initial placement of the device for the topping operation.

During initial placement, as shown in FIG. 1 of a tree harvesting device according to the present invention, as well as during subsequent movement of the device down a standing tree, it is necessary that the shear and clamp assembly 14 be maintained in a horizontal condition wherein its front to rear central axis is perpendicular to the longitudinal axis of the tree. To achieve the same, in spite of a continuously varying angle between the boom 12 and the shear and clamp assembly 14, the present invention provides a unique pendulum-type connecting assembly 60 which will now be described.

Figure 4:
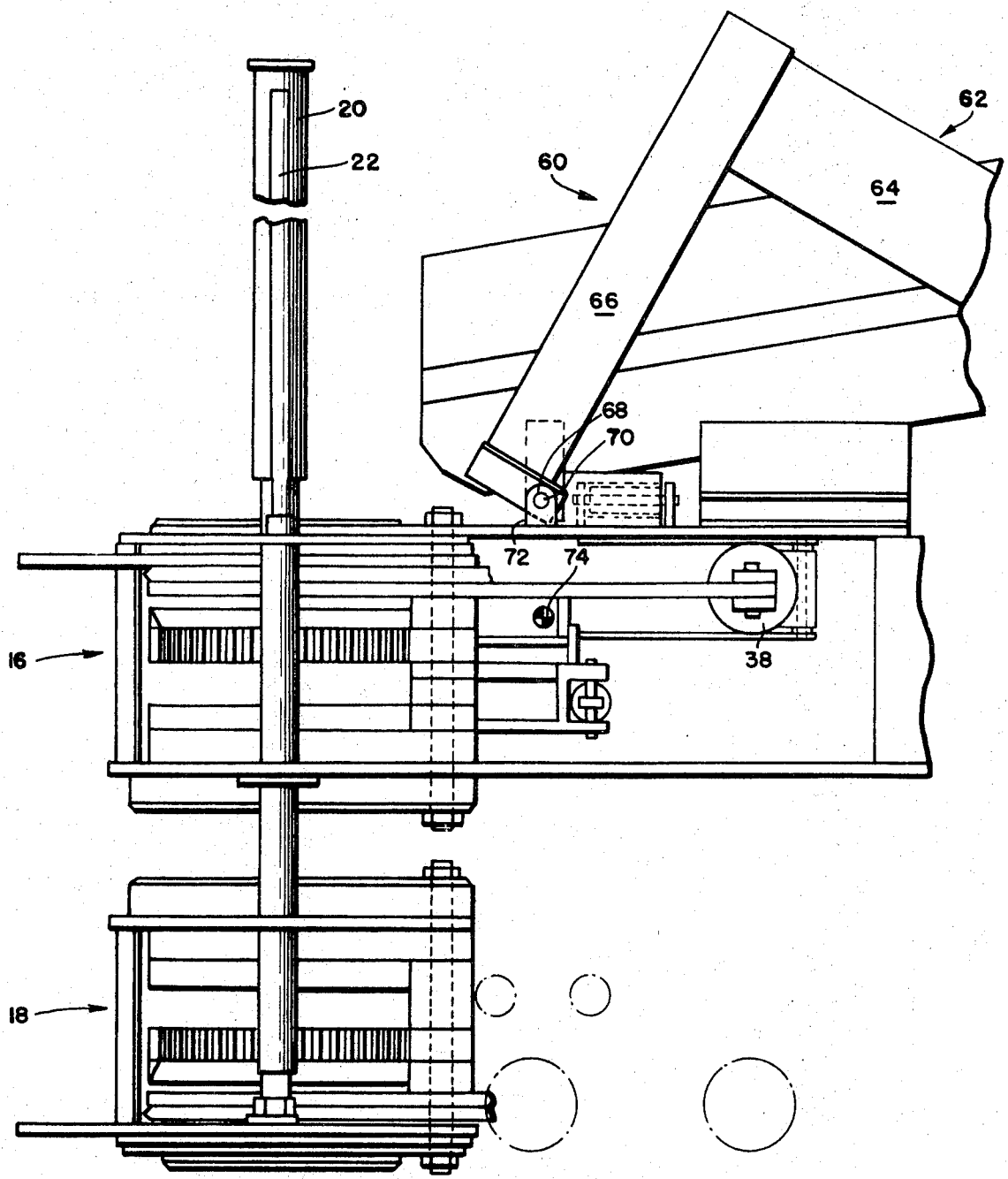
FIG. 4 is a fragmentary side view of the tree shear and clamp assembly shown in FIG. 2 including a connecting means according to the present invention.

As best seen in FIGS. 3 and 4, the connection assembly 60 includes a generally L-shaped support yoke 62 defined by a pair of laterally spaced support beams 64. The rear end of each beam 64 is rigidly fixed to the telescopic boom 12 and the forward end includes a short leg 66 which is downwardly directed. Apertures 68 are provided in the lower end of the short legs 66 which receive pins 70, the lateral ends of which are pivotally received in flanges 72 fixed to the frame 24. It is of particular importance that the present invention includes positioning of the pivotal connection between the boom 12 and the shear and clamp assembly 14 vertically above the center of gravity 74 of the latter. In this manner, regardless of the vertical angular orientation of the boom 12, which, of course, varies as the apparatus is moved down a standing tree, the shear and clamp assembly swings free in pendulum form and remains in a horizontal position convenient for embracing a tree without resort to independent motor means to adjust the vertical angle between the boom and shear and clamp assembly to achieve this result.

While in the foregoing detailed description reference has been made to but one specific embodiment of the present invention, it should be understood that the structure and operation thereof may be varied by those skilled in the art without departing from the spirit and scope of the present invention which is to be defined by the following claims.

We claim:

1. A tree harvesting device including:
    (a) A boom adapted to be pivoted through a vertical angle;
    (b) severing means adapted to sever a tree; and
    (c) connecting means freely pivotally suspending said severing means from said boom for maintaining said severing means in a horizontal condition at any operational angle of said boom.

2. A tree harvesting device according to claim 1 wherein said connecting means includes pivot means directly vertically above the center of gravity of said severing means.

3. A tree harvesting device according to claim 2 wherein said severing means includes a pair of shear blades.

4. A tree harvesting device according to claim 3 further including tree clamp means adjacent said shear blades for supporting the device on a standing tree.

5. A tree harvesting device according to claim 4 further including second shear and clamp means positioned below said severing means, and fluid motor means connecting said severing means and said second shear and clamp means for relative vertical movement therebetween.

6. A tree harvesting device according to claim 5 further including telescopic boom means for supporting the device on a vehicle.

References Cited

UNITED STATES PATENTS 2,707,007   4/1955   Shuff   144—208

GERALD A. DOST, Primary Examiner

U.S. Cl. X.R.

144—2